United States Patent
Cheikh et al.

(10) Patent No.: US 9,887,460 B2
(45) Date of Patent: Feb. 6, 2018

(54) NEAR-FIELD COMMUNICATION DEVICE COMPRISING TWO NFC AREAS

(71) Applicants: CONTINENTAL AUTOMOTIVE FRANCE, Toulouse (FR); CONTINENTAL AUTOMOTIVE GmbH, Hannover (DE)

(72) Inventors: Mohamed Cheikh, Toulouse (FR); Guillaume Vigneau, Merenville (FR); Said Bouguern, Blagnac (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/595,235

(22) Filed: May 15, 2017

(65) Prior Publication Data

US 2017/0338559 A1 Nov. 23, 2017

(30) Foreign Application Priority Data

May 19, 2016 (FR) ..................... 16 54443

(51) Int. Cl.
*H04W 4/00* (2009.01)
*H04B 5/00* (2006.01)
(Continued)

(52) U.S. Cl.
CPC ............ *H01Q 5/314* (2015.01); *H01Q 5/335* (2015.01); *H01Q 21/28* (2013.01)

(58) Field of Classification Search
CPC ...... H04B 5/00; H04B 5/0025; H04B 5/0087; H04B 5/02; H01Q 1/36; H04W 4/00; H04W 4/008
See application file for complete search history.

(56) References Cited

U.S. PATENT DOCUMENTS

2011/0043429 A1* 2/2011 Merlin ............... G06K 19/0723
343/860
2011/0183601 A1* 7/2011 Hannon ................. B60K 35/00
455/1

(Continued)

FOREIGN PATENT DOCUMENTS

EP    2 805 856 A1    11/2014
FR    3 025 641 A1    3/2016

OTHER PUBLICATIONS

FR Search Report, dated Jan. 24, 2017, from corresponding FR application.

*Primary Examiner* — Blane Jackson
(74) *Attorney, Agent, or Firm* — Young & Thompson

(57) ABSTRACT

A near-field communication device includes: a processing module and a first antenna arranged in a first near-field communication area and connected to the processing module; a first presence detector arranged in the first area; a second antenna arranged in a second near-field communication area, the first antenna and the second antenna being electrically in series and forming a circuit of antennae; a second presence detector arranged in the second area; and a control circuit designed to place the circuit of antennae into at least two different operating modes: a) a first mode, termed 'functional mode', in which the circuit of antennae allows near-field communication, and b) a second mode, termed 'dysfunctional mode', in which the circuit of antennae does not allow near-field communication.

20 Claims, 2 Drawing Sheets

(51) Int. Cl.
*H01Q 1/36* (2006.01)
*H01Q 5/314* (2015.01)
*H01Q 21/28* (2006.01)
*H01Q 5/335* (2015.01)

(56) References Cited

U.S. PATENT DOCUMENTS

2014/0058586 A1 2/2014 Kalhous et al.
2016/0218773 A1* 7/2016 Yang .................. G06K 7/10237
2016/0242124 A1* 8/2016 Zhou ................... G06K 7/0008

* cited by examiner

NEAR-FIELD COMMUNICATION DEVICE COMPRISING TWO NFC AREAS

FIELD OF THE INVENTION

The present invention falls within the field of devices designed for communication between electronic appliances. More particularly, the present invention relates to a near-field communication (NFC) device enabling communication with one or more near-field communication appliances (smartphones or other appliances). A particularly advantageous, although in no way limiting, application of the present invention is in communication devices installed in motor vehicles.

BACKGROUND OF THE INVENTION

The near-field communication (NFC) protocol allows frames to be exchanged between items of equipment up to a distance of approximately 10 centimeters. This near-field communication technology is used in numerous sectors.

In particular, it is known to provide a near-field communication area in the proximity of a motor vehicle dashboard. The driver may bring a near-field communication appliance, such as a smartphone, a tablet or any other appliance equipped with an NFC module, close to this area, so as to establish a near-field communication between the appliance and a motor vehicle computer. This communication may serve for example to authorize starting of the motor vehicle via a secure smartphone, to perform pairing between the near-field communication appliance and the motor vehicle computer, this pairing making it possible to establish a Bluetooth connection in the passenger compartment, or for any other use.

As near-field communication has a short range in a motor vehicle, it is not easy for all of the passengers to have access to the near-field communication area. It is therefore necessary to provide a second near-field communication area in another location of the motor vehicle. Naturally, when a plurality of near-field communication areas are present, it is necessary to implement certain priority rules between the areas. In some cases, it must be impossible to use the second near-field communication area in the absence of an NFC appliance over the first near-field communication area.

The problem that is faced is therefore that of creating electronic circuits that make it possible to manage NFC communication simultaneously over a plurality of near-field communication areas and the priorities between the areas, while lowering costs as much as possible.

The problem of managing the priorities between the areas is particularly large in the specific case of a motor vehicle comprising a near-field communication area arranged in the proximity of the dashboard that enables starting of the motor vehicle and a second near-field communication area intended for telematic use. In this case, the device must prohibit the use of the second near-field communication area intended for telematic use when no NFC appliance is present in the proximity of the first near-field communication area that enables starting of the vehicle. In effect, this management of the priorities between areas makes it possible to ensure the safety of the passengers, and makes it possible to prevent the use of the second near-field communication area for telematic purposes when the motor vehicle has not been started, as this would risk draining the battery.

By way of example, the prior art implements a number of devices. Systems exist in which the two near-field communication areas each comprise an NFC antenna connected to a processing module, these two separate processing modules being connected to an on-board computer of the motor vehicle that manages the priorities between the areas. This system has the drawback of being very expensive; indeed, it requires the presence of two modules for processing the frames exchanged with the NFC antennae.

SUMMARY OF THE INVENTION

The object of the present invention is therefore to provide a more efficient and less costly solution than the prior art for managing the simultaneous communication of a computer with a plurality of near-field communication areas, making it possible to implement prioritization regarding the use of the areas.

According to a first aspect, the invention relates to a near-field communication device comprising:
  a processing module and a first antenna arranged in a first near-field communication area and connected to said processing module,
  a first presence detector arranged in the first area,
  a second antenna arranged in a second near-field communication area, the first antenna and the second antenna being electrically in series and forming a circuit of antennae,
  a second presence detector arranged in the second area,
  a control circuit designed to place the circuit of antennae into at least two different operating modes:
    a first mode, termed 'functional mode', in which the circuit of antennae allows near-field communication,
    a second mode, termed 'dysfunctional mode', in which the circuit of antennae does not allow near-field communication,
    said control circuit being configured to place the circuit of antennae into the functional mode or into the dysfunctional mode depending on detection signals provided by the first presence detector and by the second presence detector.

Thus, the near-field communication device advantageously enables simultaneous near-field communication over the first and the second area, with two separate near-field communication appliances, this being achieved with a single processing module for a plurality of NFC antennae. This is therefore a more economical solution.

The control circuit, when it places the circuit of antennae into dysfunctional mode, makes it possible to prohibit the device from any near-field communication. The control circuit places the circuit of antennae into functional or mismatched mode according to a predetermined logic, which may be chosen depending on the priorities associated with the NFC areas.

According to specific embodiments, the invention furthermore exhibits the following features, implemented separately or in any technically possible combination thereof.

In one embodiment, the control circuit is configured to place the circuit of antennae into the dysfunctional mode if and only if:
  the detection signal provided by the first presence detector indicates the presence of a near-field communication appliance in the proximity of said first area, and
  the detection signal provided by the second presence detector indicates the absence of a near-field communication appliance in the proximity of the second area,
the control circuit being configured to place the circuit of antennae into functional mode for all of the other combinations of detection signals provided by the first presence detector and the second presence detector.

This logic for prohibiting the use of the device is intended to afford priority to the second near-field communication area over the first near-field communication area.

In one embodiment, the circuit of antennae comprises at least one first capacitor having a capacitance adapted to ensure that the circuit of antennae resonates at a resonant frequency that is suitable for near-field communication when the circuit of antennae is in functional mode.

In another embodiment, the control circuit comprises a first switch making it possible to short-circuit the first capacitor so that the circuit of antennae resonates at a frequency that is not suitable for near-field communication, in order to place the circuit of antennae into dysfunctional mode.

In another embodiment, the control circuit comprises a first switch making it possible to open the circuit of antennae in order to place it into dysfunctional mode.

In any case, this system for managing the priority of the antennae has the advantage of being simple, inexpensive and of consisting entirely of hardware, thus circumventing the problems of reaction times and thresholds peculiar to the use of software.

Furthermore, the detection of the presence of NFC objects is carried out at the NFC areas, and the antennae are placed into dysfunctional mode at the same location without having to pass through the processing module, which reduces costs in terms of cabling.

In one embodiment, said first capacitor is arranged in the second area.

In one embodiment, the circuit of antennae furthermore comprises a second capacitor arranged in the first area.

This second capacitor makes it possible to improve the resonance of the circuit of antennae.

In one embodiment, said control circuit is arranged in the second area and/or in the first area. The control circuit that manages the priorities between the areas is therefore completely independent of the control module.

In one embodiment, the device furthermore comprises an active antenna connected to the processing module, and the circuit of antennae is coupled electromagnetically to said active antenna such that said circuit of antennae is connected to the processing module by means of the active antenna.

This configuration of antennae has the advantage of optimizing the resonance of the antenna and of improving the near-field communication over the two areas for a low electrical consumption.

In one embodiment, the circuit of antennae is connected directly to the processing module.

This is the simplest configuration, comprising only two antennae instead of the three in the preceding configuration.

In one embodiment, the first antenna and the second antenna are connected to each other by twisted wires.

These twisted wires, which connect the first NFC communication area and the second NFC communication area, make it possible to prevent problems of coupling or magnetic induction.

The device described here has the advantage of managing the priority between the first area and the second area quickly and completely independently of the processing module.

According to a second aspect, the present invention relates to a motor vehicle comprising a near-field communication device according to any one of the embodiments of the invention.

BRIEF DESCRIPTION OF THE DRAWINGS

Other advantages, objectives and features of the present invention will become apparent from the following description, given by way of wholly non-limiting explanation with reference to the appended drawings, in which.

DETAILED DESCRIPTION OF THE INVENTION

Figure 1:
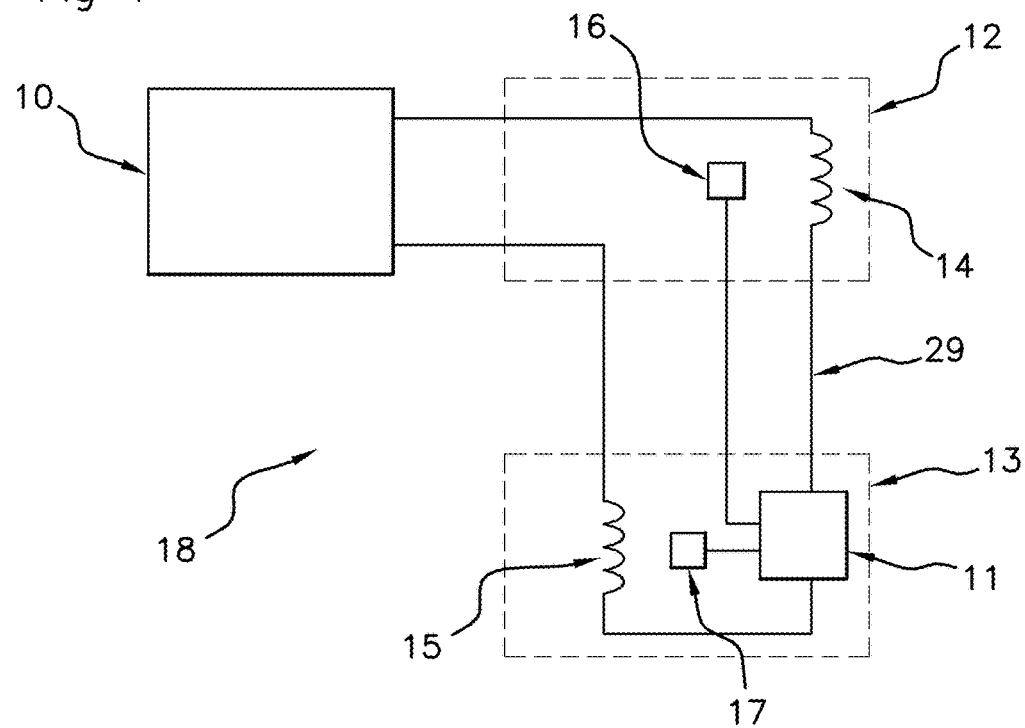
FIG. 1 schematically shows one specific embodiment of the invention, wherein the circuit of antennae is connected directly to the processing module, FIG. 2 schematically shows one specific embodiment of the invention, wherein the device comprises an active antenna coupled electromagnetically to the circuit of antennae, FIG. 3 schematically shows one possible embodiment of the invention in more detail, wherein the first switch makes it possible to short-circuit the first capacitor, FIG. 4 schematically shows one possible embodiment of the invention, wherein the first switch is designed to open the circuit of antennae.

It will be noted that, from this point onwards, the figures are not to scale.

The invention finds its place in the context of devices 18 designed to enable near-field communication with one or more near-field communication appliances.

Near-field communication, or NFC, is understood to mean a short-range, high-frequency, wireless communication technology that enables the exchange of information between items of equipment.

In some embodiments, it is possible to exchange information up to a distance of about 10 cm, with the technology used applying an extension of the standard ISO/IEC 14443.

Near-field communication appliance is understood to mean any electronic appliance designed to communicate information using the NFC communication protocol. Nowadays, for example, numerous smartphones, touchscreen tablets and chip cards are near-field communication appliances.

A device 18 according to one of the embodiments described here may for example be embedded on board a motor vehicle.

The invention relates to a near-field communication device 18 comprising:
  a processing module 10,
  and a first antenna 14 arranged in a first near-field communication area 12 and connected to said processing module 10,
  and a second antenna 15 arranged in a second near-field communication area 13, the first antenna 14 and the second antenna 15 being electrically in series and forming a circuit of antennae 29.

The processing module 10 may for example comprise an NFC microcontroller, an electromagnetic compatibility (EMC) filter and an NFC matching stage, all of these components being known per se to a person skilled in the art. The processing module 10 is able to exchange frames with the near-field communication antennae that are connected thereto. The processing module 10 is generally connected to a computer with which it exchanges information.

The processing module 10, when it exchanges frames on its port connected to one or more antennae, is not normally designed to identify with which of the antennae connected thereto it is communicating. The processing module 10 is therefore unable to identify that antenna in the proximity of which the near-field communication appliance with which said module is communicating is situated. In contrast, the processing module 10 is designed to exchange frames simultaneously with a plurality of near-field communication appliances present in the proximity of one or more NFC antennae connected to the processing module 10, as the processing module 10 is equipped with an anti-collision protocol.

The present invention therefore advantageously authorizes simultaneous near-field communication over the first area 12 and the second area 13, with two separate near-field communication appliances. The present invention comprises only a single processing module 10 for a plurality of NFC antennae, and is therefore a very economical solution.

Figure 2:
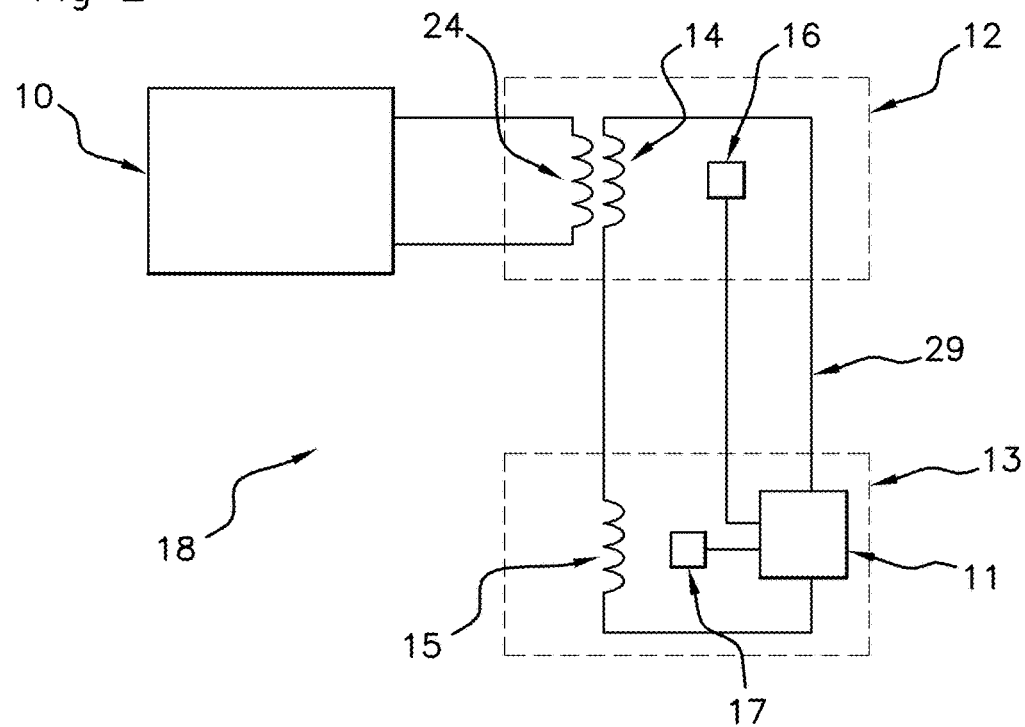

Two separate embodiments are possible for said circuit of antennae 29:

- in a first embodiment illustrated by FIG. 1, the circuit of antennae 29 is connected directly to the processing module 10,
- in a second embodiment illustrated by FIG. 2, the device 18 furthermore comprises an active antenna 24 connected to the processing module 10, and the circuit of antennae 29 is coupled electromagnetically to said active antenna 24 such that said circuit of antennae 29 is connected to the processing module 10 by means of the active antenna 24.

The operation of the system is similar for these two embodiments, but the embodiment comprising an active antenna 24 is preferred as it has a better electromagnetic operation and a better quality factor, and makes it possible to achieve a greater current in the second antenna 15 present in the second area 13 for the same power consumption.

Each of the antennae outlined here may be capable of transmitting and receiving NFC signals to and from one or more near-field communication appliances.

To this end, in one embodiment, the circuit of antennae 29 comprises a first capacitor 19 having a capacitance adapted to ensure that the circuit of antennae 29 resonates at a resonant frequency that is suitable for near-field communication.

In one embodiment, said first capacitor 19 is arranged in the second near-field communication area 13.

In one embodiment, the circuit of antennae 29 furthermore comprises a second capacitor 23 arranged in the first area 12, making it possible to improve the resonance of the circuit of antennae 29.

In one embodiment, the first antenna 14 and the second antenna 15 are connected to each other by twisted wires 28. Said twisted wires 28, connecting the first NFC communication area 12 and the second NFC communication area 13, make it possible to prevent problems of coupling or magnetic induction.

The near-field communication device 18 furthermore comprises:

- a first presence detector 16 arranged in the first area 12, and a second presence detector 17 arranged in the second area 13.

These presence detectors are electronic circuits designed to provide a detection signal representative of the presence or of the absence of a near-field communication appliance in the proximity of the area in which they are installed.

In one embodiment, a presence detector comprises a capacitor, a resistor and a coil that form a passive resonant circuit capable of generating an induced voltage under the effect of the fields transmitted by an NFC appliance when such an appliance is in the proximity of said circuit. The characteristic values of the electronic components present in a presence detector are designed to enable its resonance at a frequency suitable for near-field communication. A presence detector may furthermore comprise a diode current bridge rectifier receiving the voltage across the terminals of the passive resonant circuit mentioned above at its input. In this case, the voltage across the output terminals of this bridge rectifier forms said detection signal representative of the presence or of the absence of a near-field communication appliance in the proximity of the area in which the presence detector is installed. This detection signal is the output of the presence detector.

The near-field communication device 18 furthermore comprises a control circuit 11 designed to place the circuit of antennae 29 into at least two different operating modes:

- a first mode, termed 'functional mode', in which the circuit of antennae 29 allows near-field communication,
- a second mode, termed 'dysfunctional mode', in which the circuit of antennae 29 does not allow near-field communication, said control circuit 11 being configured to place the circuit of antennae 29 into the functional mode or into the dysfunctional mode depending on detection signals provided by the first presence detector 16 and by the second presence detector 17.

The output signals of the first presence detector 16 and of the second presence detector 17 are connected to the input of the control circuit 11.

It is necessary to establish selection priorities between the first near-field communication area 12 and the second near-field communication area 13. The control circuit 11 performs this function. Generally, the control circuit 11 prohibits the device 18 from any near-field communication when it places the circuit of antennae 29 into dysfunctional mode.

In one embodiment, said control circuit 11 is arranged in the second area 13 and/or in the first area 12. This means that the control circuit that manages the priorities between the areas is completely independent of the control module.

For example, the control circuit 11 may be configured to place the circuit of antennae 29 into the dysfunctional mode if and only if:

- the detection signal provided by the first presence detector 16 indicates the presence of a near-field communication appliance in the proximity of said first area 12, and
- the detection signal provided by the second presence detector 17 indicates the absence of a near-field communication appliance in the proximity of the second area 13, the control circuit 11 being configured to place the circuit of antennae 29 into functional mode for all of the other combinations of detection signals provided by the first presence detector 16 and the second presence detector 17.

In this example, a summary will be provided of the operation of the control circuit 11 and of the mode into which the circuit of antennae 29 will be placed depending on the presence or the absence of near-field communication appliances:

- if a near-field communication appliance is present in the proximity of the first area 12 and no near-field communication appliance is present in the proximity of the second area 13, then a voltage produced by the first presence detector 16 is applied at the input of the control circuit 11, whereas the second presence detector 17 does not produce any voltage. In this case, the control circuit 11 places the circuit of antennae 29 into dysfunctional mode.
- if a near-field communication appliance is present in the proximity of the first area 12 and a near-field communication appliance is present in the proximity of the second area 13, then a voltage produced by the first presence detector 16 is applied at the input of the control circuit 11, and a voltage produced by the second presence detector 17 is applied at the input of the control circuit 11. In this case, the control circuit 11 places the circuit of antennae 29 into functional mode.

if no near-field communication appliance is present in the proximity of the first area 12 and a near-field communication appliance is present in the proximity of the second area 13, then no voltage is produced by the first presence detector 16, whereas a voltage produced by the second presence detector 17 is applied at the input of the control circuit 11. In this case, the control circuit 11 places the circuit of antennae 29 into functional mode.

if no near-field communication appliance is present in the proximity of the first area 12 and no near-field communication appliance is present in the proximity of the second area 13, then no voltage is produced by the first presence detector 16, and no voltage is produced by the second presence detector 17. In this case, the control circuit 11 places the circuit of antennae 29 into functional mode.

In this example, the logic for prohibiting the use of the device 18 is intended to afford priority to the second near-field communication area 13 over the first area 12, and the second area 13 will therefore advantageously be positioned in the proximity of the driver in the event that the device 18 is installed on board a motor vehicle.

Figure 3:
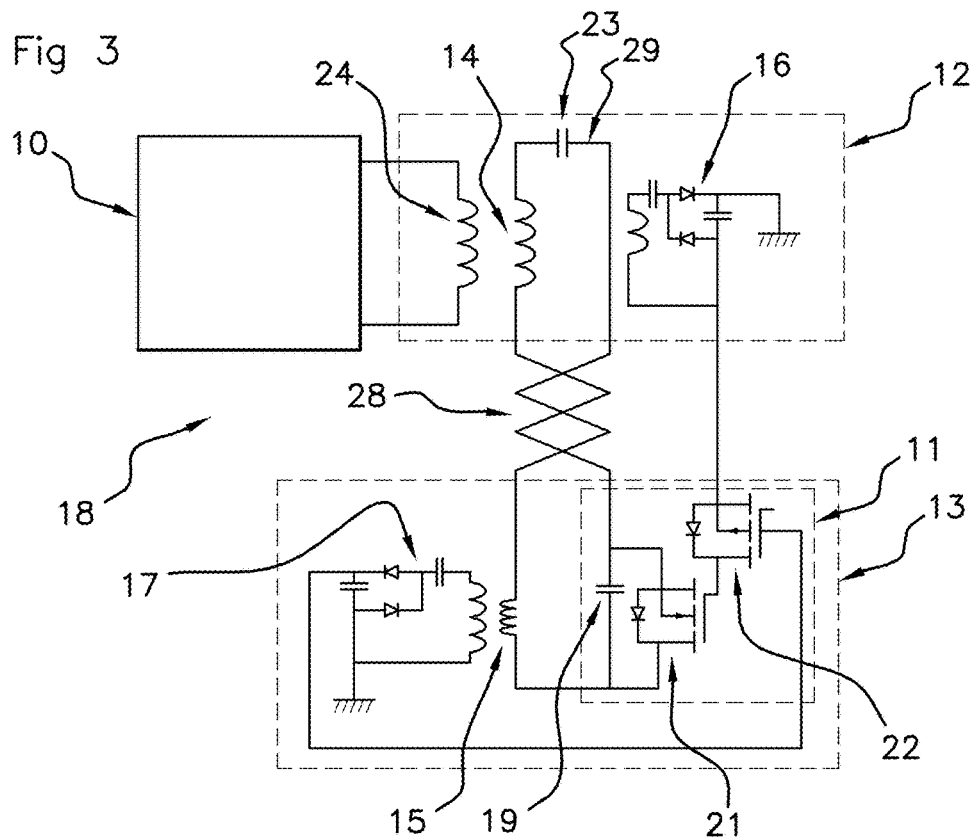
Figure 4:
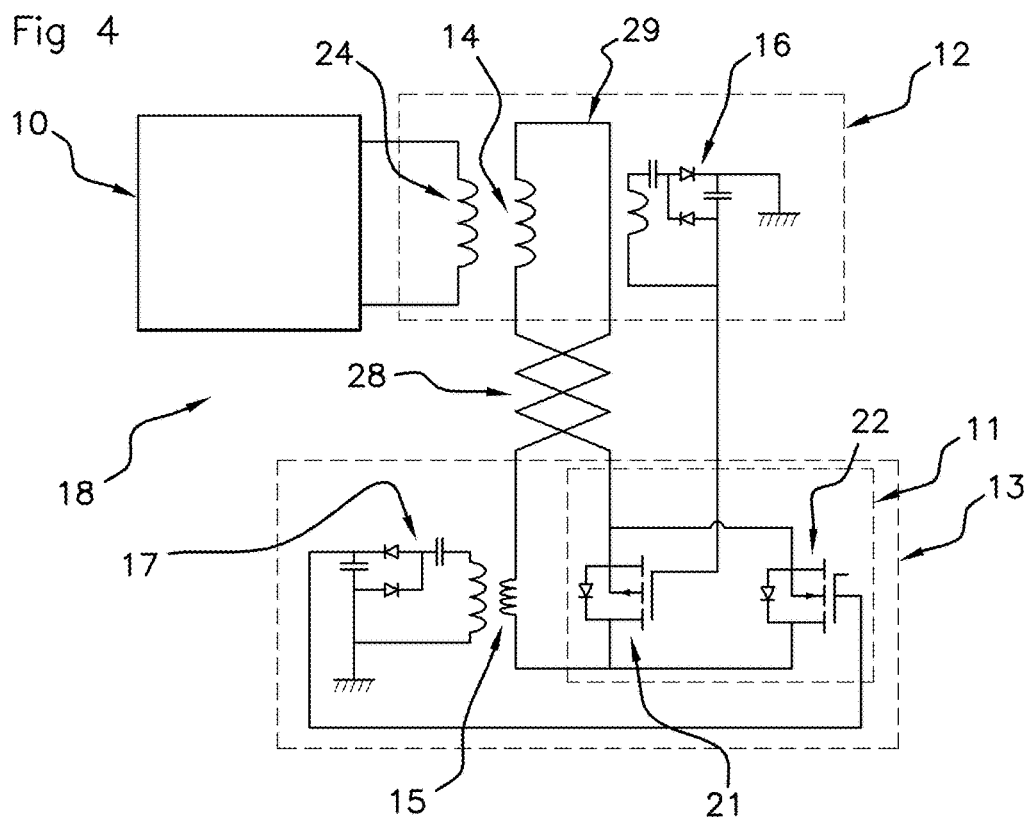

The control circuit 11 may be implemented in a variety of ways. FIG. 3 and FIG. 4 show two possible variant embodiments of said control circuit 11:

in one embodiment illustrated by FIG. 3, the control circuit 11 comprises a first switch 21 making it possible to short-circuit the first capacitor 19 so that the circuit of antennae 29 resonates at a frequency that is not suitable for near-field communication, in order to place the circuit of antennae 29 into dysfunctional mode, in one embodiment illustrated by FIG. 4, the control circuit 11 comprises a first switch 21 designed to open the circuit of antennae 29 in order to place it into dysfunctional mode.

In the embodiment illustrated by FIG. 3, said first switch 21 may for example be an N-type transistor, the source and drain of which are connected on both sides of said first capacitor 19, its gate being connected to the drain of a second switch 22, which may be a P-type transistor. In this example, the source of said second switch 22 is connected to the output signal of the first presence detector 16, and the gate of said second switch is connected to the output signal of the second presence detector 17.

In the embodiment illustrated by FIG. 4, said first switch 21 may for example be a P-type transistor, the source and drain of which are connected electrically in series with the circuit of antennae 29, its gate being connected to the output signal of the first presence detector 16. In this example, a second switch 22 has its source and its drain connected to the same points as the first switch 21 in the circuit of antennae 29, the gate of said second switch 22 being connected to the output signal of the second presence detector 17. In this example, the second switch 22 is an N-type transistor.

P-type transistor is understood to mean a transistor that allows current to flow between its source and its drain when its gate is not supplied with power and that isolates its source and its drain when its gate is supplied with power. In one embodiment, the P-type transistor is a PMOS or JFET transistor.

N-type transistor is understood to mean a transistor that isolates its source and its drain when it is not supplied with power and that allows current to flow between its source and its drain when it is supplied with power. In one embodiment, the N-type transistor is an NMOS transistor.

This control circuit 11 enabling the management of the priority of the antennae has the advantage of being simple, inexpensive, of consisting entirely of hardware and being independent of the processing module 10, thus circumventing the problems of reaction times and thresholds peculiar to the use of software. Furthermore, since the detection of the presence of NFC objects is carried out at the first near-field communication area 12 and second near-field communication area 13, and since the circuit of antennae 29 is placed into dysfunctional mode at the same location directly by the control circuit 11, it is not necessary to connect the control circuit 11 to the processing module 10, which reduces costs in terms of cabling.

In one embodiment, devices designed to provide other functions may be arranged in the second area 13 or in the first area 12, for example a wireless inductive smartphone charger.

If the near-field communication device 18 is embedded on board a motor vehicle, communication between one or more near-field communication appliances and the device may serve several purposes: starting the motor vehicle with a smartphone equipped with a secure chip, telematic communication such as pairing a smartphone with a motor vehicle computer in order to enable the prompt establishment of a Bluetooth connection inside the passenger compartment, or other applications.

The invention claimed is:

1. Near-field communication device (18) comprising:
a processing module (10) and a first antenna (14) arranged in a first near-field communication area (12) and connected to said processing module (10),
a first presence detector (16) arranged in the first area (12), wherein
said device (18) furthermore comprises:
a second antenna (15) arranged in a second near-field communication area (13), the first antenna (14) and the second antenna (15) being electrically in series and forming a circuit of antennae (29),
a second presence detector (17) arranged in the second area (13),
a control circuit (11) designed to place the circuit of antennae (29) into at least two different operating modes:
a first mode, termed 'functional mode', in which the circuit of antennae (29) allows near-field communication,
a second mode, termed 'dysfunctional mode', in which the circuit of antennae (29) does not allow near-field communication,
said control circuit (11) being configured to place the circuit of antennae (29) into the functional mode or into the dysfunctional mode depending on detection signals provided by the first presence detector (16) and by the second presence detector (17).

2. Device (18) according to claim 1, wherein the control circuit (11) is configured to place the circuit of antennae (29) into the dysfunctional mode if and only if:
the detection signal provided by the first presence detector (16) indicates the presence of a near-field communication appliance in the proximity of said first area (12), and
the detection signal provided by the second presence detector (17) indicates the absence of a near-field communication appliance in the proximity of the second area (13), the control circuit (11) being configured to place the circuit of antennae (29) into functional mode for all of the other combinations of detection signals provided by the first presence detector (16) and the second presence detector (17).

3. Device (18) according to claim 2, wherein the circuit of antennae (29) comprises a first capacitor (19) having a capacitance adapted to ensure that the circuit of antennae (29) resonates at a resonant frequency that is suitable for near-field communication.

4. Device (18) according to claim 2, wherein the control circuit (11) comprises a first switch (21) designed to open the circuit of antennae (29) in order to place it into dysfunctional mode.

5. Device (18) according to claim 2, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

6. Device (18) according to claim 1, wherein the circuit of antennae (29) comprises a first capacitor (19) having a capacitance adapted to ensure that the circuit of antennae (29) resonates at a resonant frequency that is suitable for near-field communication.

7. Device (18) according to claim 6, wherein the control circuit (11) comprises a first switch (21) making it possible to short-circuit the first capacitor (19) so that the circuit of antennae (29) resonates at a frequency that is not suitable for near-field communication, in order to place the circuit of antennae (29) into dysfunctional mode.

8. Device (18) according to claim 7, wherein said first capacitor (19) is arranged in the second area (13).

9. Device (18) according to claim 7, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

10. Device (18) according to claim 6, wherein said first capacitor (19) is arranged in the second area (13).

11. Device (18) according to claim 10, wherein the circuit of antennae (29) furthermore comprises a second capacitor (23) arranged in the first area (12).

12. Device (18) according to claim 10, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

13. Device (18) according to claim 6, wherein the control circuit (11) comprises a first switch (21) designed to open the circuit of antennae (29) in order to place it into dysfunctional mode.

14. Device (18) according to claim 6, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

15. Device (18) according to claim 1, wherein the control circuit (11) comprises a first switch (21) designed to open the circuit of antennae (29) in order to place it into dysfunctional mode.

16. Device (18) according to claim 15, wherein said first capacitor (19) is arranged in the second area (13).

17. Device (18) according to claim 15, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

18. Device (18) according to claim 1, further comprising an active antenna (24) connected to the processing module (10), and wherein the circuit of antennae (29) is coupled electromagnetically to said active antenna (24) such that said circuit of antennae (29) is connected to the processing module by means of the active antenna (24).

19. Device (18) according to claim 1, wherein the circuit of antennae (29) is connected directly to the processing module (10).

20. Motor vehicle comprising a near-field communication device (18) according to claim 1.

* * * * *